United States Patent Office 3,663,529
Patented May 16, 1972

3,663,529
AZO DYESTUFFS CONTAINING A PHENYL-PIPERIDINE COUPLING COMPONENT
Ved Parkash Kubba, Bombay, India, and Visvanathan Ramanathan and Walter Jenny, Basel, Switzerland, assignors to Ciba Limited, Basel, Switzerland
No Drawing. Filed June 13, 1969, Ser. No. 833,144
Claims priority, application Switzerland, June 14, 1968, 8,833/68
Int. Cl. C09b 29/36
U.S. Cl. 260—156         2 Claims

ABSTRACT OF THE DISCLOSURE

Azo dyestuffs which contain at least one residue of a coupling component of formula

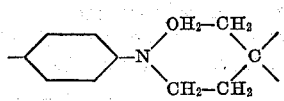

wherein the carbon atom which is located in the 4-position of the azacyclohexane ring is bonded to 1 or preferably 2 identical or mutually different positivising groups which are capable of rendering an adjacent methylene group acid.

---

The present invention relates to azo dyestuffs which contain at least one residue of a coupling component of formula

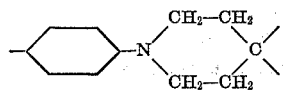

wherein the carbon atom which is in the 4-position of the azacyclohexane ring is bonded to 1 or preferably 2 identical or different positivising groups which are able to render an adjacent methylene group acid.

Positivising groups which are able to activate an adjacent methylene group, that is to say to render it acid, according to F. Klages "Lehrbuch der organischen Chemie," Volume II, pages 116–118, Berlin 1964, possess a +F effect or positivising field effect. A list of compounds with methylene groups which have been rendered acid is to be found in Gould "Mechanismus und Struktur in der organischen Chemie," page 436, Weinheim 1962.

Suitable monovalent or divalent groups which exert an acid-rendering effect are for example the nitrile, carbalkoxy, carboalkyleneoxy, arylsulphonyl, aryloxycarbonyl, alkylcarbonyl or optionally N-alkylated or N-arylated carboxylic acid amide groups.

The groups of the formulae —COOCH$_3$, COOC$_4$H$_9$,

—SO$_2$—C$_6$H$_4$—CH$_3$(-p), —CO—C$_4$H$_9$

—CO—O—C$_6$H$_{12}$—O—CO—

—CO—NH—C$_6$H$_{12}$—NH—CO—, —CO—NH—C$_4$H$_9$ may be mentioned as examples.
Particularly preferred dyestuffs are those of formula

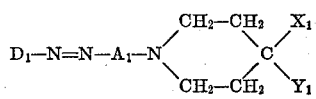

wherein X$_1$ denotes a monovalent negative group which renders an adjacent methylene group acid, Y$_1$ denotes a hydrogen atom or preferably a monovalent negative group which renders an adjacent methylene group acid, and D$_1$ and A$_1$ have the same significance as below and denote the dyestuffs of formula

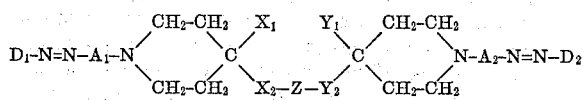

wherein D$_1$ and D$_2$ each denote the residue of a diazo component, A$_1$ and A$_2$ each denote an optionally substituted 1,4-phenylene residue, X$_2$ and Y$_2$ each denote a divalent negative acid-rendering group such as for example a

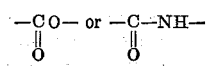

group, and X$_1$ and Y$_1$ denote the same as above, and Z is a divalent organic residue, especially a hydrocarbon residue which is optionally interrupted by hetero-atoms.

The diazo residues D$_1$ and D$_2$ are mainly derived from monocyclic or bicyclic amines of formulae D$_1$—NH$_2$ or D$_2$—NH$_2$ such as any desired diazotisable heterocyclic amines which do not contain any acid substituents which confer solubility in water, but especially from amines which possess a heterocyclic 5-membered ring with 2 or 3 hetero-atoms, above all a nitrogen atom and one or two sulphur, oxygen or nitrogen atoms as hetero-atoms, and negatively substituted aminobenzenes, especially those of formula

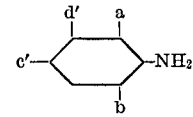

wherein $a$ denotes a hydrogen or halogen atom, an alkyl or alkoxy group, a nitro, nitrile, carbalkoxy or alkylsulphone group, $b$ denotes a hydrogen or halogen atom or an alkyl, nitrile or trifluoromethyl group, $c'$ denotes a nitro, nitrile, carbalkoxy or alkylsulphonyl group and $d'$ denotes a hydrogen or halogen atom or a nitrile, carboxylic acid ester or carboxylic acid amide group.

As examples, there may be mentioned:

2-aminothiazole,
2-amino-5-nitrothiazole,
2-amino-5-methylsulphonyl-thiazole,
2-amino-5-cyanothiazole,
2-amino-4-methyl-5-nitrothiazole,
2-amino-4-methylthiazole,
2-amino-4-phenylthiazole,
2-amino-4-(4'-chloro-)phenylthiazole,
2-amino-4-(4'-nitro)-phenylthiazole, 3-aminopyridine,
3-aminoquinoline,
3-aminopyrazole, 3-amino-1-phenylpyrazole,
3-aminoindazole, 3-amino-1,2,4-triazole,
5-methyl-, ethyl-, phenyl- or benzyl-)-1,2,4-triazole,
3-amino-1-(4'-methoxyphenyl)-pyrazole,
2-aminobenzthiazole,
2-amino-6-methylbenzthiazole,
2-amino-6-methoxybenzthiazole,
2-amino-6-chlorobenzthiazole,
2-amino-6-cyanobenzthiazole,
2-amino-6-rhodanbenzthiazole,
2-amino-6-nitrobenzthiazole,
2-amino-6-carbethoxybenzthiazole,
2-amino(4- or 6-)methylsulphonylbenzthiazole,
2-amino-1,3,4-thiadiazole,
2-amino-1,3,5-thiadiazole,
2-amino-4-phenyl- or -4-methyl-1,3,5-thiadiazole,
2-amino-5-phenyl-1,3,4-thiadiazole,
2-amino-3-nitro-5-methylsulphonyl-thiophene,
2-amino-3,5-bis-(methylsulphonyl)-thiophene,
5-amino-3-methylisothiazole, 2-amino-4-cyano-pyrazole,
2-(4'-nitrophenyl)-3-amino-4-cyanopyrazole,
3- or -4-aminophthalimide, aminobenzene,
1-amino-4-chlorobenzene, 1-amino-4-bromobenzene,
1-amino-4-methylbenzene, 1-amino-4-nitrobenzene,
1-amino-4-cyanobenzene,
1-amino-4-methylsulphonylbenzene,
1-amino-4-carbalkoxybenzene, 1-amino-2,3- or -2,4-dichlorobenzene,
1-amino-2,4-dibromobenzene,
1-amino-2-methyl-4-chlorobenzene,
1-amino-2-trifluoromethyl-4-chlorobenzene,
1-amino-2-cyano-4-chlorobenzene,
1-amino-2-carbomethoxy-4-chlorobenzene,
1-amino-2-carbomethoxy-4-nitrozenzene,
1-amino-2-chloro-4-cyanobenzene,
1-amino-2-chloro-4-nitrobenzene,
1-amino-2-bromo-4-nitrobenzene,
1-amino-2-chloro-4-carbethoxybenzene,
1-amino-2-chloro-4-methylsulphonylbenzene,
1-amino-2-methylsulphonyl-4-chlorobenzene,
1-amino-2-methylsulphonyl-4-nitrobenzene,
1-amino-2,4-dinitrobenzene,
1-amino-2,4-dicyanobenzene,
1-amino-2-cyano-4-methylsulphonylbenzene,
1-amino-2,6-dichloro-4-cyanobenzene,
1-amino-2,6-dichloro-4-nitrobenzene,
1-amino-2,4-dicyano-6-chlorobenzene,
4-aminobenzoic acid cyclohexyl ester,
1-amino-2,4-dinitro-6-chlorobenzene
and especially 1-amino-2-cyano-4-nitrobenzene, and also 1-aminobenzene-2-, -3- or -4-sulphonic acid amides, such as the N-methylamide or N,N-dimethylamide or diethylamide,
1-amino-2,3-or -2,4-dibrom-anthraquinone,
N,γ-isopropyloxypropyl-2-amino-naphthalene-6-sulphonic acid amide,
N,γ-isopropyloxypropyl-1-aminobenzene-2-, -3- or 4-sulphonic acid amide,
N-isopropyl-1-aminobenzene-2-, -3- or -4-sulphonic acid amide,
N,γ-methoxypropyl-1-amniobenzene-2-, -3- or -4-sulphonic acid amide,
N,N-bis(β-hydroxyethyl)-1-aminobenzene-2-, -3- or 4-sulphonic acid amide,
1-amino-4-chlorobenzene-2-sulphonic acid amide, and the N-substituted derivatives, 2-, 3- or 4-aminophenylsulphamate, 2-amino-4-, -5- or -6-methylphenylsulphamate, 2-amino-5-methoxy-phenylsulphamate, 3 - amino-6-chlorophenylsulphamate, 3-amino - 2,6 - dichlorophenylsulphamate, 4-amino-2- or -3-methoxyphenylsulphamate,
N,N-dimethyl-2-aminophenylsulphamate,
N,N-di-n-butyl-2-aminophenylsulphamate,
N,N-dimethyl-2-amino-4-chlorophenylsulphamate,
N,n-propyl-3-aminophenylsulphamate,
N,N-di-n-butyl-3-aminophenylsulphamate,
O(3-aminophenyl)-N-morpholine-N-sulphonate,
O(3-aminophenyl)-N-piperidine-sulphonate,
N-cyclohexyl-O-(3-aminophenyl)-sulphamate,
N(N-methylaniline)-O-(3-aminophenyl)sulphonate,
N,N-diethyl-3-amino-6-methylphenylsulphamate,
N-ethyleneimine-O-(4-aminophenyl)-sulphonate,
N,N-dimethyl-4-aminophenylsulphamate,
O(n-propyl)-O(3-aminophenyl)sulphonate,
O,β-chlorethyl-O(2-aminophenyl)sulphonate,
O-benzyl-O(3-aminophenyl)sulphonate and
O-ethyl-O(4-amino-2,6-dimethylphenyl)sulphonate.

4-aminoazobenzenes which can be used as diazo components are for example 4-aminoazobenzene,
3,2'-dimethyl-4-aminoazobenzene,
2-methyl-5-methoxy-4-aminoazobenzene,
4-amino-2-nitroazobenzene,
4-amino-3-nitroazobenzene,
2,5-dimethoxy-4-aminoazobenzene,
4'-methoxy-4-aminoazobenzene,
2-methyl-4'-methoxy-4-aminoazobenzene,
3,6,4'-trimethoxy-4-aminoazobenzene,
4'-chlor-4-aminoazobenzene,
2'- or 3'-chlor-4-aminoazobenzene,
3-nitro-4-amino-2',4'-dichlorazobenzene and
4-aminoazobenzene-4'-sulphonic acid amide.

Instead of the abovementioned diazo components which are free of ionic groups which confer solubility in water, it is also possible to use diazo components which contain fibre-reactive groups, such as for example s-triazinyl residues which carry 1 or 2 chlorine or bromine atoms on the triazine ring, pyrimidyl residues which carry one or two chlorine atoms and/or one or two arylsulphonyl or alkylsulphonyl groups on the pyrimidine ring, mono- or bis-(γ-halogen-β-hydroxypropyl)-amino groups, β - halogenethylsulphamyl residues, β - halogenethoxy groups, β-halogenethylmercapto groups, 2-chloro-benzthiazolyl - 6-azo groups, 2-chlorobenzthiazolyl-6-amino groups, γ-halogeno-β-hydroxy-propylsulphamyl residues, chloracetylamino groups, α,β-dibromopropionyl groups, vinylsulphonyl groups or 2,3-epoxypropyl groups.

Suitable fire-reactive diazo components are for example

N,β-chlorethyl-3-chlor-4-aminobenzenesulphonamide (hydrochloride),
N,β-chlorethyl-4-aminobenzenesulphonamide (hydrochloride),
3-brom-4-amino-ω-chloracetophenone,
N,γ-chloro-β-hydroxypropyl-4-aminobenzenesulphonamide,
N,β-chlorethyl-1-amino-4-naphthylsulphonamide,
N,β-chlorethyl-1-amino-3,5-dichlorobenzenesulphonamide and
4-(γ-chloro-β-hydroxypropoxy)-aniline.

The groups $A_1$ and $A_2$ are preferably residues of formula

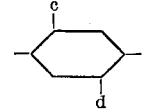

wherein $c$ and $d$ are hydrogen atoms or methyl, ethyl, methoxy, ethoxy, phenylthio or phenoxy residues.

The group $c$ is preferably bonded in the ortho-position to the azo group and can, in addition to the abovementioned groups, also denote a chlorine or bromine atom, a trifluoromethyl grup, an alkylsulphonyl group, preferably a methylsulphonyl group, and an acylamino group which is optionally alkylated, preferably methylated, on the nitrogen atom, in which the acyl residue is the residue of an organic monocarboxylic acid, an organic monosulphonic acid such as methanemonosulphonic, ethanemonosulphonic or p-toluenemonosulphonic acid or the residue of a carbamic acid or of a carbonic acid monoester or monoamide, such as phenoxycarbonyl, methoxycarbonyl and aminocarbonyl.

The new azo dyestuffs which contain at least one residue of a coupling component of formula

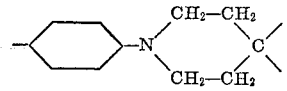

are obtained by condensation or by coupling it being optionally possible to quaternise the resulting azo dyestuff if it contains quaternisable nitrogen atoms, especially in the diazo residues.

MANUFACTURE BY CONDENSATION

The manufacture by malonic ester condensation takes place by reacting a dyestuff which possesses at least one N,N - bis - (β-halogenethyl)-amino, N,N-bis-(β-arylsulphonyloxyethyl)-amino or N,N - bis-(β-alkylsulphonylethyl)-amino group, especially at least one N,N-bis-(β-chlorethyl)-amino group, with a compound which contains at least one acid methylene group.

Dyestuffs having a terminal N,N-bis-[β-(halogen and/or alkyl and/or arylsulphonyloxy)ethyl-]amino group, which are suitable as starting substances for the condensation, are obtained by coupling the corresponding coupling components with the abovementioned diazo components, for example by coupling N,N-bis-(β-chlorethyl)-aniline with the diazonium compounds of 2,6-dichloro-4-nitro-aniline or 5- or 6-nitro-2-aminobenzthiazol.

Suitable compounds for the malonic ester condensation are for example malonic acid diethyl ester, malonic acid dimethyl ester, malonic acid di-sec.-butyl ester, malonic acid di-tert.-butyl ester, malonic acid mono-ethyl ester-monoamide, acetoacetic acid ethyl ester, acetoacetic acid amide, acetoacetic acid diethylamide, acetoacetic acid N-phenylamide, barbituric acid, Meldrum acid, indanedione-(1,3), dimedone, malonic acid dinitrile, cyanacetic acid methyl ester, cyanacetic acid ethyl ester, cyanacetic acid butyl ester, cyanacetic acid isobutyl ester, cyanacetamide, cyanacetmethylamide, cyanacetphenylamide, cyanacetdimethylamide, methylsulphonylacetonitrile and phenylsulphonylacetonitrile.

Bifunctional methylene-active compounds can for example be obtained if one of the abovementioned monocarboxylic acid esters is reacted with a glycol, that is to say if for example cyanacetic acid ethyl ester is trans-esterified with 1,6-hexane-diol or amidated with 1,6-hexa-methylenediamine.

The condensation takes place in a manner which is in itself usual, for example in the presence of alkaline earth or alkali alcoholates in the corresponding alcohols, or in the presence of sodium amide and benzene, toluene or dimethylformamide. A further selection of solvents and alkaline catalysts is given in the article by A. C. Cope et al. in "Organic Reactions," Volume IX, pages 107–144, John Wiley Sons, New York, 1957. Compare also Fieser and Fieser, Organic Chemistry, "Alkylierung von Ketonen," pages 528 to 540, Weinheim 1965.

MANFACTURE BY COUPLING

The dyestuffs are preferably manufactured by coupling a coupling component which contains at least one residue of a N-phenylpiperidine of formula

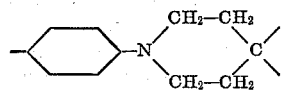

wherein the carbon atom which is in the 4-position of the cyclohexane ring is bonded to 2 identical or different positivising groups which are able to render an adjacent methylene group acid, with a diazo compound of one of the amines $D_1$—$NH_2$ or $D_2$—$NH_2$ quoted above.

Suitable coupling components are for example those of formula

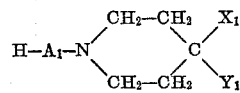

wherein $A_1$ is a p-phenylene residue, $X_1$ is a monovalent negative acid-rendering group and $Y_1$ is a hydrogen atom or preferably a monovalent negative acid-rendering group, such as 4-cyano-4-carbethoxy-N-phenyl-piperidine,
4-cyano-4-carbomethoxy-N-phenyl-piperidine,
4,4-dicarbethoxy-N-phenyl-piperidine,
4-amido-4-carbethoxy-N-phenyl-piperidine,
4,4-dicyano-N-phenyl-piperidine,
4-amido-4-cyano-N-phenyl-piperidine and
4-cyano-4-carbethoxy-N,m-tolyl-piperidine.

Further coupling components of this nature can be obtained by condensation of the methylene-active compounds quoted above with substituted bis-(β-halogen-ethyl-, β-alkylenesulphonyloxyethyl- or β-arylsulphonyloxyethyl-) anilines; these latter compounds are obtained if the appropriate bis - (p - hydroxyethyl-)anilines are treated with chlorinating agents such as for example phosphorus oxychloride or thionyl chloride, or with sulphonating agents such as p-tosyl bromide, p-benzenesulphonyl chloride or methanesulphonyl chloride. Suitable bishydroxyethylanilines are for example N,N-bis-(β-hydroxyethyl)-3-acetylamino-aniline,
N,N-bis-(β-hydroxyethyl)-5-methoxy-aniline,
N,N-bis-(β-hydroxyethyl)-3,5-dimethoxy-aniline,
N,N-bis-(β-hydroxyethyl)-3,5-dimethylaniline,
N,N-bis-(β-hydroxyethyl)-3-chloraniline,
N,N-bis-(β-hydroxyethyl)-3-trifluoromethyl-aniline and
N,N-bis-(β-hydroxyethyl)-3-methyl-6-methoxy-aniline.

It is also possible to convert one coupling component into another; for example, 4-carbamido-4-carboethoxy-N-phenyl-piperidine can be obtained from 4-cyano-4-carboethoxy-N-phenyl-piperidine by saponification of the nitrile group in concentrated sulphuric acid.

The diazotisation is performed in a manner which is in itself known, for example in aqueous solution containing mineral acid, using alkali salts of nitrous acid or in concentrated sulphuric acid using nitrosylsulphuric acid.

The coupling can also be performed in a manner which is in itself known, for example in a neutral to acid medium, optionally in the presence of sodium acetate or similar buffer substances which influence the coupling speed or of catalysts such as for example pyridine or its salts.

After the coupling reaction has taken place, the non-quaternised dyestuffs formed can be separated from the coupling mixture, for example by filtration, since they are practically insoluble in water.

Instead of a single diazo component it is also possible to use a mixture of two or more of the diazo components according to the invention and instead of a single coupling component it is also possible to use a mixture of two or more of the coupling components according to the invention.

If the residues $D_1$ and/or $D_2$ of the diazo components contain quaternisable nitrogen atoms such as for example the abovementioned heterocyclic amines of formula $D_1$—$NH_2$ and $D_2$—$NH_2$, then the dyestuffs can be quaternised and this preferably takes place as the last stage.

The quaternisation is performed by treatment with esters of strong mineral acids or of organic sulphonic acids, such as for example dimethylsulphate, diethylsulphate, alkyl halides, such as methyl chloride, bromide or iodide, aralkyl halides, such as benzyl chloride, esters of low molecular alkanesulphonic acids, such as for example the methyl ester of methanesulphonic, ethanesulphonic or butanesulphonic acid and the alkyl esters of 4-(4-methyl-, 4-chloro- or 3- or 4-nitro)-benzenesulphonic acid, which form halogen, sulphuric acid half-ester, alkanesulphonic acid or benzenesulphonic acid anions as the anions, preferably with warming in inert organic solvents, for example xylene, carbon tetrachloride, o-dichlorobenzene and nitrobenzene. It is however also possible to use solvents such as acetic anhydride, dimethylformamide, acetonitrile or dimethylsulphoxide. The quaternised dyestuffs preferably contain, as the anion $Y^-$, the residue of a strong acid such as of sulphuric acid or of its half-esters, or a halogen ion, but can also be used as double salts, for example with zinc chloride, or as free bases.

The dyestuffs described above as a rule contain no acid groups which confer solubility in water, especially no sulphonic acid groups, and are therefore sparingly soluble or insoluble in water. If they contain quaternised nitrogen atoms then they are on the other hand soluble in water.

The new dyestuffs, their mixtures with one another and their mixtures with other azo dyestuffs are excellently suited to dyeing and printing synthetic fibres such as for example acrylic fibres or acrylonitrile fibres, polyacrylonitrile fibres and copolymers of acrylonitrile and other vinyl compounds, such as acrylic esters, acrylamides, vinylpyridine, vinyl chloride or vinylidene chloride, copolymers of dicyanethylene and vinyl acetate, as well as (fibres of) acrylonitrile block copolymers, fibres of polyurethanes, polyolefines, cellulose triacetate and 2½-acetate, polyamides, such as nylon-6, nylon-6,6 and nylon-12, and especially fibres of aromatic polyesters such as those from terephthalic acid and ethylene glycol or 1,4-dimethylolcyclohexane, and copolymers of terephthalic and isophthalic acid and ethylene glycol.

A further subject of the present invention is therefore a process for dyeing or printing synthetic fibres, especially polyester fibres, which is characterised in that azo dyestuffs which are free of carboxyl and sulphonic acid groups, and which contain at least one residue of a coupling component of formula

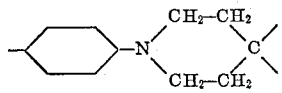

wherein the carbon atom in the 4-position of the cyclohexane ring is bonded to 2 identical or different positivising groups which are capable of rendering an adjacent methylene group acid, are used.

Deep dyeings of good fastness to light and outstanding fastness to sublimation are obtained.

For dyeing fibres containing ester groups, especially polyester fibres, the non-quaternised new dyestuffs are appropriately used in a finely divided form and dyeing is carried out with the addition of dispersing agents, soap, sulphite cellulose waste lye or synthetic detergents, or a combination of different wetting and dispersing agents. As a rule it is appropriate to convert the dyestuffs, before dyeing, into a dyeing preparation which contains a dispersing agent and finely divided dyestuff in such a form that on dilution of the dyestuff preparations with water a fine dispersion is produced. Such dyestuff preparations can be obtained in a known manner, for example by reprecipitating the dyestuff from sulphuric acid and grinding the suspension thus obtained with sulphite waste lye, and optionally also by grinding the dyestuff in high efficiency grinding devices in the dry or wet form, with or without addition of dispersing agents during the grinding process.

The new water-insoluble dyestuffs are, because of their fastness to alkali, especially suitable for dyeing according to a so-called thermofixing process, according to which the woven fabric to be dyed is impregnated with an aqueous dispersion of the dyestuff which appropriately contains 1 to 50% of urea and a thickener, especially sodium alginate, preferably at temperatures of at most 60° C., and is squeezed out in the usual manner. Squeezing out is appropriately carried out in such a way that the impregnated goods retain 50 to 100% of their starting weight of dyeing liquid.

In order to fix the dyestuff, the woven fabric impregnated in this way is heated, appropriately after prior drying, for example in a warm stream of air, to temperatures of above 100° C., for example between 180 and 220° C.

Because of the high sublimation fastness of the new water-insoluble dyestuffs, textile articles dyed with them are also suitable for a subsequent "permanent press" finishing by means of heat-curable resins which are applied to the articles after dyeing, together with latent curing agents, and are cured hot in appropriate moulds.

The thermofixing process just mentioned is of particular interest for dyeing mixed woven fabrics of polyester fibres and cellulose fibres, especially cotton. In this case the padding liquid contains, in addition to the dispersed dyestuffs according to the invention, also dyestuffs which are suitable for dyeing cotton, especially vat dyestuffs or reactive dyestuffs, that is to say dyestuffs which can be fixed on the cellulose fibre with the formation of a chemical bond, that is for example dyestuffs containing a chlorotriazine or chlorodiazine residue. In the latter case it proves appropriate to add an acid-binding agent, for example an alkali carbonate or alkali phosphate, alkali borate or alkali perborate or their mixtures to the padding solution. When using vat dyestuffs it is necessary to treat the padded woven fabric, after the heat treatment, with an aqueous alkaline solution of a reducing agent usual in vat dyeing. The resulting dyeings are appropriately subjected to a post-treatment, for example by heating with an aqueous solution of an non-ionic detergent.

As a result of their good wool reserve the water-insoluble dyestuffs according to the invention are also excellently suited to dyeing mixed woven fabrics of polyester fibres and wool.

The water-insoluble dyestuffs can also be applied by printing. For this purpose, a printing ink is for example used which in addition to the auxiliary agents which are usual in printing, such as wetting agents and thickeners, contains the finely dispersed dyestuff, optionally mixed with one of the above-mentioned cotton dyestuffs, optionally in the presence of urea and/or an acid-binding agent. Furthermore, the dyestuffs can also be used for dyeing and printing in the form of solutions in organic media, for example in a mixture of 90% of perchlorethylene and 10% of dimethylacetamide for padding polyester or nylon woven fabrics.

The new water-soluble quaternised dyestuffs or dyestuff salts are suitable for dyeing and printing the most diverse fully synthetic fibres, such as for example polyvinyl chloride, polyamide, polyurethane and especially polyacrylic fibres. The quaternised water-soluble dyestuffs are generally not very sensitive to electrolytes and in part show a pronouncedly good solubility in water or polar solvents. Dyeing with the quaternised water-soluble dyestuffs is generally performed in an aqueous, neutral or acid medium, at the boiling point under atmospheric pressure, or in a closed vessel at elevated temperature and elevated pressure. The commercially available levelling agents can be added.

The new dyestuffs are furthermore also suitable for the bulk dyeing of polymerisation products of acrylonitrile, of polyolefines, and also of other plastic compositions, and furthermore for the colouring of oil paints and lacquers. In the case of fibre-reactive water-insoluble dyestuffs an acid-binding agent, for example an alkali carbonate or alkali phosphate, alkali borate or alkali perborate or their mixtures are used, especially when dyeing nylon or basic-modified polyester, polyacryl or polypropylene fibres, in order to fix the dyestuff during or after dyeing.

In the examples which follow the parts, unless otherwise specified, denote parts by weight and the percentages denote percentages by weight.

Instruction 1

4.6 parts of sodium are dissolved in 200 parts of absolute ethanol. The resulting sodium alcoholate solution is treated dropwise with 22.6 parts of cyanacetic acid ethyl ester. Thereafter 21.8 parts of N,N-β,β-dichlorodiethylaniline are added. The mixture is boiled for 12 hours under reflux. The precipitated sodium chloride is separated off by filtration and the bulk of the alcohol is removed by distillation. The residue is cooled and mixed with water. The oil which has separated out is extracted with ether, dried over sodium sulphate and evaporated, and the residual oil is distilled in vacuo. Excess cyanacetic acid ester first passes over, and thereafter 14 parts of 4-cyano-4-carbethoxy-N-phenylpiperidine distil over (boiling point 196 to 198° C./2–3 mm. Hg).

Using 24.8 parts of N,N-(β,β'-dichlorethyl)-o-methoxy-aniline, 12 parts of 4-cyano-4-carbethoxy-N-(o-methoxyphenyl)piperidine (boiling point 190° C./2 mm. Hg) are obtained in an analogous manner.

Instruction 2

4.6 parts of sodium were dissolved in 200 parts of absolute methyl alcohol. The resulting sodium alcoholate solution was treated dropwise with 19.8 parts of cyanacetic acid methyl ester and thereafter 21.8 parts of N,N-bis-(β-chlorethyl)-aniline were added. The mixture was boiled for 12 hours under reflux, the sodium chloride which had separated out was filtered off and the bulk of the alcohol was removed by distillation. The residue is cooled and diluted with water, and the oil which has separated out is extracted with ether and dried over sodium sulphite. The solvent is evaporated off and the residue is distilled in vacuo. Excess cyanacetic acid ester first passes over, and thereafter 12 parts of 4-cyano-4-carbomethoxy-N-phenylpiperidine pass over. This material is recrystallised from dilute methanol. Melting point 77–78° C.

Using 19.8 parts of N,N-bis-(β-chlorethyl)-o-methoxy-aniline, 14 parts of 4-cyano-4-carbomethoxy-N-(o-methoxyphenyl)-piperidine (boiling point 205–207° C./2 mm. Hg; melting point 61° C.) were obtained in an analogous manner.

Instruction 3

4.6 parts of sodium metal are dissolved by means of 200 parts of absolute ethyl alcohol. 32 parts of malonic acid diethyl ester are added dropwise to the resulting sodium alcoholate solution. Thereafter 21.8 parts of N,N-bis(β-chlorethyl)-aniline are added. The mixture is boiled for 14 hours under reflux. The precipitated sodium chloride is removed by filtration and the bulk of the alcohol is distilled off. The residue is cooled and mixed with water. The oil which has separated out is extracted with ether and the ether extract is dried over sodium sulphate. The solvent is removed by distillation and the residual oil is distilled in vacuo. Excess diethyl malonate first passes over, followed by 11 parts of 4,4-dicarbethoxy-N-phenylpiperidine.

dropwise to the resulting sodium alcoholate solution. Thereafter 21.8 parts of N,N-bis(β-chlorethyl)-aniline are added. The mixture is heated for 12 hours under reflux, the sodium chloride which has separated out is removed by filtration and the bulk of the alcohol is removed by distillation. The residue is cooled and mixed with water. The oil which has separated out is extracted with ether and the ether extract is dried over sodium sulphate. After evaporation of the solvent, the residue is distilled in vacuo. Excess malodinitrile first passes over, and thereafter 10.0 parts of 4,4-dicyano-N-phenylpiperidine (195 to 200° C./1 mm. Hg) are obtained.

The distilled 4,4-dicyano-N-phenylpiperidine contained a small quantity of the corresponding amide, that is to say 4-carbonamido-4-cyano-N-piperidine, which was separated off by filtration and recrystallised from benzene (melting point 167 to 168° C.).

Instruction 6

4.6 parts of sodium metal are dissolved in 200 parts of absolute ethyl alcohol. The resulting sodium alcoholate solution is treated dropwise with 22.6 parts of cyanacetic acid ethyl ester. Thereafter 23.2 parts of N,N-bis-(β-chlorethyl)-m-toluidine are added. The mixture was heated for 12 hours under reflux, the sodium chloride which had separated out was removed by filtration and the bulk of the alcohol was evaporated off. The residue is cooled and mixed with water. The oil which has separated out is extracted with ether and the ether extract is dried over sodium sulphate. After evaporating off the solvent, the residual oil was distilled in vacuo. Excess cyanacetic acid ester first passed over, followed by 14 parts of 4-cyano-4-carbethoxy-N-m-tolylpiperidine (boiling point 195 to 200° C./2 mm. Hg). After recrystallisation from dilute ethanol the product has a melting point of 51–52° C.

The phenylpiperidines mentioned in column 3 were manufactured in an analogous manner from the starting components mentioned in columns 1 and 2, unless otherwise stated.

| | 1 | 2 | 3 |
|---|---|---|---|
| 1 | β,β'-Dichloro-diethyl-m-toluidine. | Cyanacetic acid methyl ester. | 4-carbomethoxy-4-cyano-1-(3-tolyl)piperdine, boiling point 195–200° C./1–2 mm. Hg. |
| 2 | 4-carbomethoxy-4-cyano-1-phenylpiperidine was dissolved in an excess of concentrated sulphuric acid and left to stand for 16 hours at room temperature. The solution was poured into ice water, rendered alkaline, and the 4-carbamoyl-4-carbomethoxy-1-phenyl-piperdine which had separated out was recrystallised from water, melting point 142–153° C. | | |
| 3 | β,β'-Dichlorodiethylaniline. | Acetoacetanilide. | 4-acetyl-4-phenylcarbamoyl-1-phenylpiperidine, melting point 151–152° C. |
| 4 | do | Acetoacetic acid ethyl ester. | 4-acetyl-4-carbethoxy-1-phenylpiperidine, boiling point 205–210° C./3 mm. Hg. |
| 5 | 4-acetyl-4-carbethoxy-1-phenylpiperidine was heated for 13 hours to 180° C. in an autoclave with an excess of diethylamine. 4-acetyl-4-(N,N-diethylcarbamoyl)-1-phenylpiperidine, boiling point 185° C./1 mm. Hg was obtained. | | |
| 6 | β,β'-Dichlorodiethylaniline. | Phenylsulphonylacetonitrile. | 4-cyano-4-phenylsulphonyl-1-phenylpiperidine, melting point 161–163° C. |
| 7 | do | Cyanacetanilide. | 4-cyano-4-phenylcarbamoyl-1-phenylpiperidine, melting point 179–180° C. |
| 8 | N,N-bis(β-chlorethyl)-N'-acetyl-m-phenylenediamine. | Cyanacetic acid ethyl ester. | 4-cyano-4-carbethoxy-1-(3-acetylaminophenyl)piperidine, melting point 140–141° C. |
| 9 | do | Cyanacetic acid methyl ester. | 4-cyano-4-carbomethoxy-1-(3-acetylaminophenyl)piperidine, melting point 153–155° C. |
| 10 | 4-carbethoxy-4-cyano-1-phenylpiperidine and an equivalent quantity of diaminoethane (relative to the carboethoxy groups) were heated to 180° C. for 8–10 hours in a steel autocalve. After working-up, 1,2-bis-(1-phenyl-4-cyano-4-carboxamido(ethane, melting point 252–253° C., was obtained. | | |
| 11 | β,β'-Dichlorodiethyl-m-toluidine. | Malodinitrile. | 4,4-dicyano-1-m-toluylpiperidine, boiling point 210–215° C./3 mm. Hg. |

Instruction 4

18.0 parts of 4-cyano-4-carbethoxy-N-phenylpiperidine are dissolved in 72 parts of concentrated sulphuric acid and kept for 8 hours at room temperature. The solution is subsequently poured into ice water and rendered alkaline with sodium carbonate. After filtration, a residue is obtained which after crystallisation from water consists of 12 parts of 4 - carbonamido-4-carbethoxy-N-phenylpiperidine of boiling point 111–112° C.

Instruction 5

4.6 parts of sodium are dissolved in 200 parts of absolute ethyl alcohol. 13.2 parts of malodinitrile are added

EXAMPLE 1

2.16 parts of 2-chloro-4-nitroaniline are diazotised at room temperature with a mixture of 20 parts by volume of concentrated sulphuric acid and 1 part of sodium nitrite. The excess nitrous acid is destroyed with urea and the reaction mixture is filtered. The resiulting solution is coupled at 5 to 10° C. with 3.23 parts of 4-cyano-4-carbethoxy-N-phenylpiperidine in a mixture of 40 parts of alcohol and 200 parts of water. The solution was stirred for 7 hours until the coupling was complete. The pH-value is then adjusted to 4 to 5 with 4 N sodium acetate solution at a temperature below 10° C. and the dyestuff is subsequently filtered off and washed with a large amount of water; if necessary, the dyestuff is reprecipitated from acetone. The resulting dyestuff corresponds to the formula

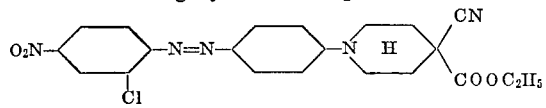

and dyes polyester fibres in red shades having excellent fastness properties.

Dyeing instruction (HT-process)

1 part of the dyestuff obtained above is ground wet with 2 parts of a 50% strength aqueous solution of the sodium salt of dinaphthylmethanedisulphonic acid and dried.

This dyestuff preparation is stirred with 40 parts of a 10% strength aqueous solution of the sodium salt of N-benzyl-$\mu$-heptadecyl-benzimidazoledisulphonic acid and 4 parts of a 40% strength acetic acid solution are added. 4000 parts of a dyebath are thereafter prepared by dilution with water.

100 parts of a cleaned polyethylene terephthalate fibre material are introduced into this bath at 50° C., the temperature is raised to 120 to 130° C. in half an hour and dyeing is carried out for one hour in a closed vessel at this temperature. Thereafter the material is well rinsed. A red dyeing of excellent fastness to light and to sublimation is obtained.

Unless otherwise specified, the shades mentioned in the examples were obtained according to the HT-process.

EXAMPLE 2

2.1 parts of 2-cyano-4-nitroaniline are diazotised in the manner described above, but 5 parts by volume of acetic acid are added. The filtered solution of the diazonium compound is coupled with 3.28 parts of 4-cyano-4-carbethoxy-N-phenylpiperidine in a mixture of 40 parts of alcohol and 20 parts of water, as above. The resulting dyestuff of formula

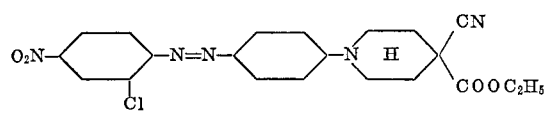

dyes polyester fibres in bluish-tinged red shades having very good fastness properties.

EXAMPLE 3

2.6 parts of 2,6-dichloro-4-nitroaniline are diazotised as in Example 1 and the filtered solution of the diazonium salt is coupled with 3.23 parts of 4-cyano-4-carbethoxy-N-phenylpiperidine analogously to Example 1. The resulting dyestuff of formula

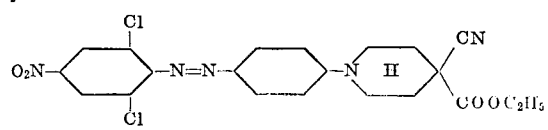

dyes polyester fibres in reddish-orange shades having excellent fastness properties.

If the phenylpiperidines mentioned in column II are coupled as above with the diazonium compounds of the amines mentioned in column I, dyestuffs are obtained which dye polyester fibres in the shades mentioned in column III.

| No. | I | II | III HT process | Thermofix process |
|---|---|---|---|---|
| 1 | 2,4-dinitro-6-chloraniline | (structure with CN, COOC₂H₅) | Bluish-tinged red. | Bluish-tinged red. |
| 2 | 2-methylsulphonyl-4-nitro-aniline | Same as above | Red | Red. |
| 3 | 2,4-dinitro-6-bromaniline | do | Bluish-tinged red. | Red. |
| 4 | 2,4-dinitro-aniline | do | Red | Red. |
| 5 | 2-chloro-4-methylsulphonyl-aniline | do | Orange | Orange. |

Dyeing instruction (Thermofix process)

20 parts of the dyestuff according to Example 3, Table No. 1, are ground with 140 parts of water containing 40 parts of sodium dinaphthylmethanedisulphonate.

A padding liquor is prepared from 200 parts of the above dyestuff preparation, 100 parts of carboxymethylcellulose (4% strength aqueous solution) and 700 parts of water, by stirring the dyestuff preparation described above into the pre-diluted thickener by means of a rapid stirrer and subsequently adjusting the mixture to a pH-value of 6 by means of 80% strength acetic acid. A woven fabric of polyester fibres is padded at 30° C. in this liquor, squeezed so as to retain 60%, and is subsequently dried at 70 to 80° C. The woven fabric is then heated to 210° C. on a stenter frame for 60 seconds and is subsequently washed hot and well rinsed with cold water. A woven fabric which is dyed bluish-tinged red and has good fastness properties is obtained.

EXAMPLE 4

2.16 parts of 2-chloro-4-nitroaniline are diazotised at room temperature as in Example 1 and the filtered solution of the diazonium compound is coupled with 3.05 parts of 4-cyano-4-carbomethoxy-N-phenylpiperidine as in Example 1. The resulting dyestuff of formula

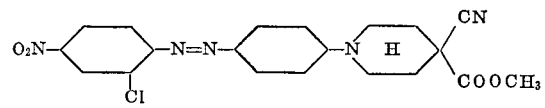

dyes polyester fibres in red shades having excellent fastness properties.

EXAMPLE 5

2.1 parts of 2-cyano-4-nitroaniline are diazotised as in Example 1 but with the addition of 5 parts by volume of acetic acid. The filtered solution of the diazonium salt is coupled with 3.05 parts of 4-cyano-4-carbomethoxy-N-phenylpiperidine in the manner described in Example 1. The resulting dyestuff of formula

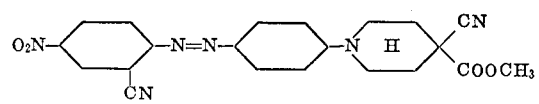

dyes polyester fibres in bluish-tinged red shades having excellent fastness properties.

EXAMPLE 6

2.6 parts of 2,6-dichloro-4-nitroaniline are diazotised in the manner described in Example 1. The filtered solution of the diazonium compound is coupled with 3.05 parts of 4-cyano-4-carbomethoxy-N-phenylpiperidine as in Example 1. The resulting dyestuff of formula

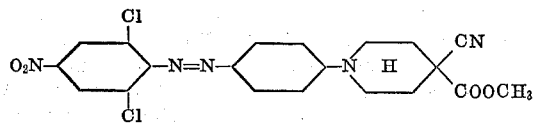

dyes polyester fibres in reddish-orange shades having excellent fastness properties.

If the phenylpiperidines mentioned in column II are coupled as above with the diazonium compounds of the amines mentioned in column I, dyestuffs are obtained which dye polyester fibres in the shades indicated in column III.

tion of the diazonium compound is coupled with 3.45 parts of 4-carbonamido-4-carbethoxy-N-phenylpiperidine as in Example 1. The resulting dyestuff of formula

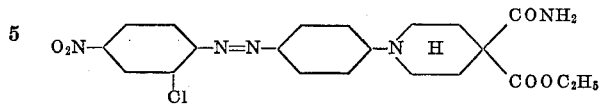

dyes polyester fibres in red shades having excellent fastness properties.

EXAMPLE 10

2.1 parts of 2-cyano-4-nitroaniline are diazotised as in Example 1 but with the addition of 5 parts by volume of acetic acid and the filtered solution of the diazonium com-

| No. | I | II | III HT process | Thermofix process |
|---|---|---|---|---|
| 1 | 2,4-dinitro-aniline | ⟨phenylpiperidine with CN, COOCH₃⟩ | Bluish-tinged red. | Bluish-tinged red. |
| 2 | 2,4-dinitro-6-chloraniline | Same as above | do | Do. |
| 3 | 2,4-dinitro-6-bromaniline | do | do | Do. |
| 4 | 2-methylsulphonyl-4-nitroaniline | do | do | Do. |
| 5 | 2-chloro-4-nitroaniline | do | do | |
| 6 | 2,6-dichloro-4-nitroaniline | do | Reddish-tinged orange. | |
| 7 | 5-nitro-2-amino-thiazole (the heterocyclic diazo component is diazotised in the presence of acetic acid:propionic acid (7:3)). | do | Bluish-tinged violet. | |
| 8 | 4-nitroaniline | do | Reddish-tinged orange. | Reddish-tinged orange. |
| 9 | 2-bromo-4-nitro-6-cyan-aniline | do | Claret | Claret. |
| 10 | 2-chloro-4-methylsulphonyl-aniline | do | Orange | Orange. |

EXAMPLE 7

1.73 parts of 2-chloro-4-nitroaniline are diazotised as in Example 1. The filtered solution of the diazonium compound is coupled with 3.05 parts of 4,4-dicarbethoxy-N-phenylpiperidine as in Example 1. The resulting dyestuff of formula

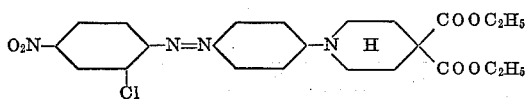

dyes polyester fibres in red shades having excellent fastness properties.

EXAMPLE 8

2.1 parts of 2-cyano-4-nitroaniline are diazotised as in Example 1 but with the addition of 5 parts by volume of acetic acid. The filtered solution of the diazonium compound is coupled with 3.81 parts of 4,4-dicarbethoxy-N-phenylpiperidine as in Example 1. The resulting dyestuff of formula

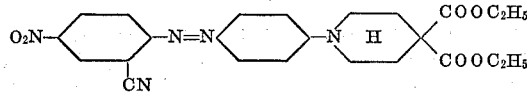

dyes polyester fibres in claret-red shades having excellent fastness properties.

EXAMPLE 9

2.16 parts of 2-chloro-4-nitroaniline are diazotised at room temperature as in Example 1 and the filtered solupound is coupled with 3.45 parts of 4-carbonamido-4-carbethoxy-N-phenylpiperidine in the manner described in Example 1. The resulting dyestuff of formula

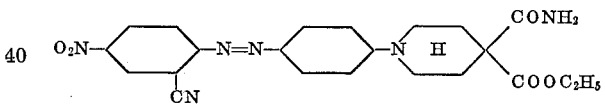

dyes polyester fibres according to the HT-process in violet-red shades and according to the thermofixing process in claret-red shades having excellent fastness properties.

EXAMPLE 11

2.6 parts of 2,6-dichloro-4-nitroaniline are diazotised as in Example 1 and the filtered solution of the diazonium salt is coupled with 3.45 parts of 4-carbonamido-4-carbethoxy-N-phenylpiperidine as in Example 1. The resulting dyestuff of formula

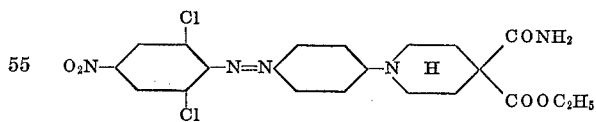

dyes polyester fibres in yellowish-red shades having excellent fastness properties.

If the phenylpiperidines mentioned in column II are coupled as above with the diazonium compounds of the amines mentioned in column I, dyestuffs are obtained which dye polyester fibres in the shades indicated in column III.

| No. | I | II | III HT process | Thermofix process |
|---|---|---|---|---|
| 1 | 2,4-dinitro-6-chlor-aniline | ⟨phenylpiperidine with CONH₂, COOC₂H₅⟩ | Reddish-violet. | Reddish-violet. |
| 2 | 2-methylsulphonyl-4-nitro-aniline | Same as above | do | Do. |
| 3 | 2,4-dinitro-aniline | do | Claret | Claret. |
| 4 | 4-methylsulphonyl-aniline | do | Reddish-orange. | Reddish-orange. |

EXAMPLE 12

1.73 parts of 2-chloro-4-nitroaniline are diazotised in the manner described in Example 1 and the filtered solution of the diazonium salt is coupled with 2.11 parts of 4,4-dicyano-N-phenylpiperidine as in Example 1. The resulting dyestuff of formula

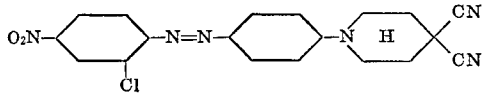

dyes polyester fibres in red shades having excellent fastness properties.

EXAMPLE 13

2.1 parts of 2-cyano-4-nitroaniline are diazotised as described in Example 1 but with the addition of 5 parts by volume of acetic acid. The filtered solution of the diazonium compound is coupled with 2.64 parts of 4,4-dicyano-N-phenylpiperidine. The resulting dyestuff of formula

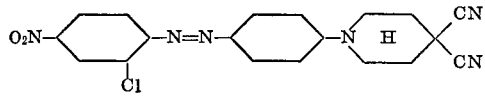

dyes polyester fibres according to the HT-process in red shades and according to the thermofixing process in bluish-tinged red shades having excellent fastness properties.

4-carbethoxy-N-m-tolylpiperidine as in Example 1. The resulting dyestuff of formula

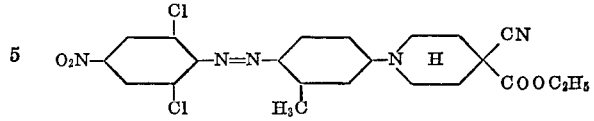

dyes polyester fibres in yellowish-red shades having excellent fastness properties.

EXAMPLE 16

2.1 parts of 2-cyano-4-nitroaniline are diazotised as in Example 1 but with the addition of 5 parts by volume of acetic acid. The filtered solution of the diazonium compound is coupled with 3.4 parts of 4-cyano-4-carbethoxy-N-m-tolylpiperidine as in Example 1. The resulting dyestuff of formula

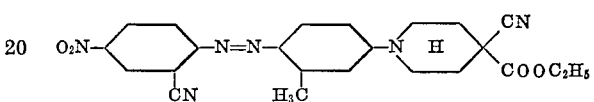

dyes polyester fibres in bluish-tinged red shades having excellent fastness properties.

If the phenylpiperidines mentioned in column II are coupled as above with the diazonium compounds of the amines mentioned in column I, dyestuffs are obtained which dye polyester fibres in the shades mentioned in column III.

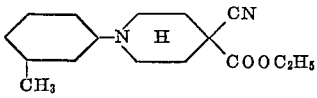

| No. | I | II | III HT process | III Thermofix process |
|---|---|---|---|---|
| 1 | 2-methylsulphonyl-4-nitro-aniline | (structure with CN, COOC₂H₅, CH₃) | Bluish-tinged red. | Bluish-tinged red. |
| 2 | 2,4-dinitro-6-chlor-aniline | Same as above | Reddish-violet. | Reddish-violet. |
| 3 | 2,4-dinitro-aniline | do | Bluish-tinged red. | Bluish-tinged red. |
| 4 | 2-chloro-4-methylsulphonyl-aniline | do | Reddish-orange. | Reddish-orange. |
| 5 | 2-methoxy-4-nitro-aniline | do | Yellowish red. | Yellowish red. |
| 6 | 2,4-dinitro-6-bromaniline | do | Reddish violet. | Reddish violet. |
| 7 | 2-methyl-4-nitro-aniline | do | Yellowish red. | Yellowish red. |

EXAMPLE 14

2.16 parts of 2-chloro-4-nitroaniline are diazotised as in Example 1 and the filtered solution of the diazonium salt is coupled with 3.1 parts of 4-cyano-4-carbethoxy-N-m-tolylpiperidine as in Example 1. The resulting dyestuff of formula

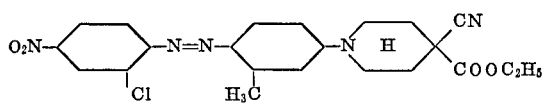

dyes polyester fibres in red shades having excellent fastness properties.

EXAMPLE 15

2.6 parts of 2,6-dichloro-4-nitroaniline are diazotised as indicated in Example 1 and the filtered solution of the diazonium compound is coupled with 3.4 parts of 4-cyano-

EXAMPLE 17

2.16 parts of 2-chloro-4-nitro-aniline were diazolised as in Example 1 and coupled with 3.6 parts of 4-cyano-4-carbethoxy-N-(o-methoxyphenyl)-piperidine. The resulting dyestuff of formula

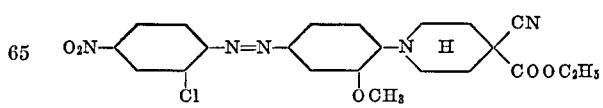

dyes polyester fibres in yellowish-tinged red shades (HT process) having excellent fastness properties.

EXAMPLE 18

2.1 parts of 2-cyano-4-nitro-aniline are diazotised as in Example 1 but with the addition of 3 parts by volume of acetic acid and are coupling with 3.6 parts of 4-cyano- 4-carboethoxy-N-(o-methoxyphenyl)-piperidine. The resulting dyestuff of formula

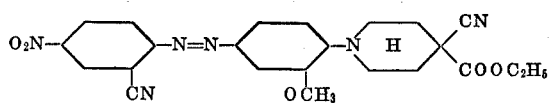

dyes polyester fibres in bluish-tinged red shades (HT-process) having excellent fastness properties.

EXAMPLE 19

2.16 parts of 2-chloro-4-nitroaniline are diazotised as in Example 1 and coupled with 3.42 parts of 4-cyano-4-carbomethoxy-N-(o-methoxyphenyl)-piperidine. The resulting dyestuff of formula

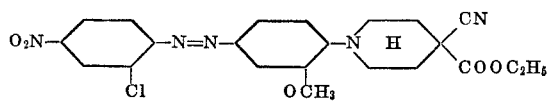

dyes polyester fibres in red shades (HT-process) having excellent fastness properties.

EXAMPLE 20

2.1 parts of 2-cyano-4-nitroaniline are diazotised as in Example 1 but with the addition of 3 parts by volume of acetic acid and are coupled with 3.42 parts of 4-cyano-4-carbomethoxy-N-(o-methoxyphenyl)-piperidine. The resulting dyestuff of formula

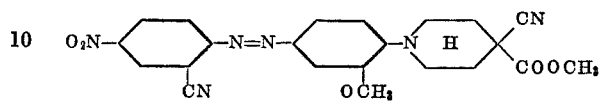

dyes polyester fibres in claret-red shades (HT-process) having excellent fastness properties.

If the phenylpiperidines mentioned in column II are coupled as above with the diazonium compounds of the amines mentioned in column I, dyestuffs are obtained which dye polyester fibres in the shades indicated in column III.

| No. | I | II | III HT process | Thermofix process |
|---|---|---|---|---|
| 1 | 2,6-dichloro-4-nitro-aniline | [piperidine with CN, COOC₂H₅, OCH₃] | Reddish orange. | Reddish orange. |
| 2 | 2,4-dinitro-aniline | Same as above | Bluish-tinged red. | Bluish-tinged red. |
| 3 | 2-methylsulphonyl-4-nitro-aniline | do | do | Do. |
| 4 | 2,4-dinitro-6-brom-aniline | do | Claret | Claret. |
| 5 | 2-chloro-4-methylsulphonyl-aniline | do | Orange | Orange. |
| 6 | 2,6-dichloro-4-nitro-aniline | [piperidine with CN, COOCH₃, OCH₃] | Bluish-tinged red. | Reddish orange. |
| 7 | 2,4-dinitro-aniline | Same as above | Bluish-tinged red. | Bluish-tinged red. |
| 8 | 2-methylsulphonyl-4-nitro-aniline | do | do | Do. |
| 9 | 2,4-dinitro-6-brom-aniline | do | Claret | Claret. |
| 10 | 2-chloro-4-nitro-aniline | do | Yellowish tinged red. | |
| 11 | 2-cyano-4-nitro-aniline | do | Claret | |
| 12 | 2,6-dichloro-4-nitro-aniline | [piperidine with CN, COOCH₃, OCH₃] | | |
| 13 | 2,4-dinitro-aniline | Same as above | | |
| 14 | 2-methylsulphonyl-4-nitro-aniline | do | Pink | |
| 15 | 2,4-dinitro-6-brom-aniline | do | Claret | Claret. |
| 16 | 2-chloro-4-nitro-aniline | [piperidine with CN, COOCH₃, CH₃] | Red | |
| 17 | 2-cyano-4-nitro-aniline | Same as above | Claret | |
| 18 | 2,6-dichloro-4-nitro-aniline | do | Yellowish-tinged red. | Brown. |
| 19 | 2-methylsulphonyl-4-nitro-aniline | do | Claret | Violet. |
| 20 | 2-chloro-4-methylsulphonyl-aniline | do | Orange | Reddish-tinged orange. |
| 21 | 2-bromo-4-nitro-6-cyan-aniline | do | Violet | Violet. |
| 22 | 2-chloro-4-nitro-aniline | [piperidine with CN, COOCH₃] | Red | |
| 23 | 2-cyano-4-nitro-aniline | Same as above | Reddish-tinged violet | Claret. |
| 24 | 2-chloro-4-nitro-aniline | [piperidine with COCH₃, CONHC₆H₅] | Red | |
| 25 | 2-cyano-4-nitro-aniline | Same as above | Reddish tinged violet. | |

TABLE—Continued

| No. | I | II | III HT process | III Thermofix process |
|---|---|---|---|---|
| 26 | 2,6-dichloro-4-nitro-aniline | Same as No. 24 | Yellowish-tinged red. | Yellowish-tinged red. |
| 27 | 2-bromo-4-nitro-6-cyan-aniline | do | Bluish-tinged violet. | Bluish-tinged violet. |
| 28 | 2-methylsulphonyl-4-nitro-aniline | do | Bluish-tinged pink. | Reddish-tinged violet. |
| 29 | 2,6-dinitro-6-chlor-aniline | do | Violet. | Violet. |
| 30 | 2,6-dinitro-6-brom-aniline | do | do | Do. |
| 31 | 2-chloro-4-methyl-sulphonyl-aniline | do | Reddish-tinged orange. | Reddish-tinged orange. |
| 32 | 2,4-dinitro-aniline | do | Reddish-tinged violet. | Reddish-tinged violet. |
| 33 | 4-nitro-aniline | do | Yellowish-tinged red. | Yellowish-tinged red. |
| 34 | 2-chloro-4-nitro-aniline | 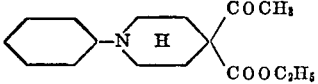 N-phenyl with COCH₃ and COOC₂H₅ substituents | Red. | Red. |
| 35 | 2-cyano-4-nitro-aniline | Same as above | Claret. | |
| 36 | 2-cyano-4-nitro-6-brom-aniline | do | Violet. | Violet. |
| 37 | 2,6-dichloro-4-nitro-aniline | do | do | Do. |
| 38 | 2-methylsulphonyl-4-nitro-aniline | do | Reddish-tinged violet. | Claret. |
| 39 | 2-chloro-4-methyl-sulphonyl-aniline | do | Reddish-tinged orange. | Reddish-tinged orange. |
| 40 | 2,4-dinitro-aniline | do | Claret. | Claret. |
| 41 | 2-cyano-4-nitro-aniline | 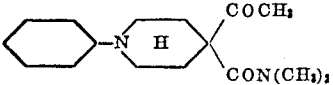 N-phenyl with COCH₃ and CON(CH₃)₂ substituents | do | |
| 42 | 2-bromo-4-nitro-6-cyan-aniline | 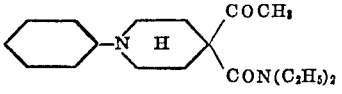 N-phenyl with COCH₃ and CON(C₂H₅)₂ substituents | Violet. | Violet. |
| 43 | 2-methylsulphonyl-4-nitro-aniline | Same as above | Reddish-tinged violet. | Claret. |
| 44 | 2-chloro-4-nitro-aniline | 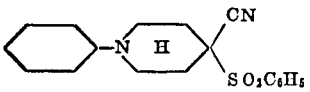 N-phenyl with CN and SO₂C₆H₅ substituents | Yellowish-tinged red. | |
| 45 | 2-cyano-4-nitro-aniline | Same as above | Red. | Brown. |
| 46 | 2-bromo-4-nitro-6-cyan-aniline | 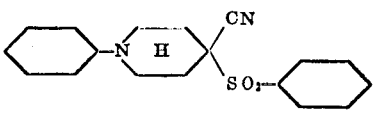 N-phenyl with CN and SO₂-phenyl substituents | Bluish-tinged pink. | Claret. |
| 47 | 2,6-dichloro-4-nitro-aniline | Same as above | Orange. | Orange. |
| 48 | 2-chloro-4-methyl-sulphonyl-aniline | do | do | Do. |
| 49 | 2,4-dinitro-aniline | do | Red. | Reddish-tinged brown. |
| 50 | 2-methylsulphonyl-4-nitro-aniline | do | Yellowish-tinged pink. | Do. |
| 51 | 2-nitro-aniline | do | Reddish-tinged orange. | Reddish-tinged orange. |
| 52 | 2-chloro-4-nitro-aniline | 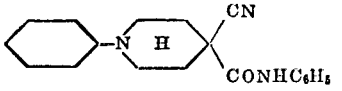 N-phenyl with CN and CONHC₆H₅ substituents | Yellowish-tinged red. | Brown. |
| 53 | 2-cyano-4-nitro-aniline | Same as above | Pink. | Bluish-tinged red. |
| 54 | 2-bromo-4-nitro-6-cyan-aniline | do | Bluish-tinged pink. | Claret. |
| 55 | 2,6-dichloro-4-nitro-aniline | do | Orange. | Brown. |
| 56 | 2-chloro-4-nitro-aniline | 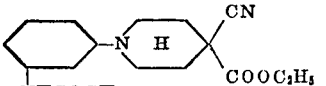 N-phenyl with NHCOCH₃, CN and COOC₂H₅ substituents | Red. | Bluish red. |
| 57 | 2-cyano-4-nitro-aniline | Same as above | Violet. | |
| 58 | 2,6-dichloro-4-nitro-aniline | do | Bluish-tinged red. | Bluish-tinged red. |
| 59 | 2-bromo-4-nitro-6-cyan-aniline | do | Reddish-tinged blue. | Reddish-tinged blue. |
| 60 | 2-chloro-4-methylsulphonyl-aniline | do | Reddish-tinged orange. | Reddish-tinged orange. |

TABLE—Continued

| No. | I | II | III HT process | Thermofix process |
|---|---|---|---|---|
| 61 | 2-methylsulphonyl-4-nitro-aniline | Same as No. 56 | Bluish-tinged tinged pink. | Reddish-tinged violet. |
| 62 | 2,4-dinitro-aniline | do | Violet | Violet. |
| 63 | 2,4-dinitro-6-chlor-aniline | do | Bluish-tinged violet. | Bluish-tinged violet. |
| 64 | 2,4-dinitro-6-brom-aniline | do | do | Do. |
| 65 | 4-nitro-aniline | do | Red | Red. |
| 66 | 2-chloro-4-nitro-aniline | [structure: phenyl-NHCOCH₃, -N-H-C(CN)(COOCH₃)] | Bluish-tinged red. | |
| 67 | 2-cyano-4-nitro-aniline | Same as above | Violet | Violet. |
| 68 | 2-bromo-4-nitro-6-cyan-aniline | do | Reddish-tinged blue. | Reddish-tinged blue. |
| 69 | 2,6-dichloro-4-nitro-aniline | do | Bluish-tinged red. | Bluish-tinged red. |
| 70 | 2-chloro-4-methylsulphonyl-aniline | do | Reddish-tinged orange. | Reddish-tinged orange. |
| 71 | 2-cyano-4-nitro-aniline | [structure: (phenyl-N-H-C(CN)(CONCH)H)₂] | Bluish-tinged red. | Bluish-tinged red. |
| 72 | 2-chloro-4-nitro-aniline | Same as above | Red | Red. |
| 73 | 2,6-dichloro-4-nitro-aniline | do | Reddish-tinged orange. | Reddish-tinged orange. |
| 74 | 2-bromo-4-nitro-6-cyan-aniline | do | Bluish-tinged pink. | Bluish-tinged pink. |
| 75 | 2-chloro-4-methylsulphonyl-aniline | do | Orange | Orange. |
| 76 | 2-methylsulphonyl-aniline | do | Pink | Pink. |
| 77 | 4-nitro-aniline | [structure: phenyl-N-H-C(CN)(COOC₂H₅)] | Reddish-tinged orange. | Reddish-tinged orange. |
| 78 | 2-bromo-4-nitro-6-cyan-aniline | Same as above | Claret | Claret. |
| 79 | 2-chloro-4-nitro-6-cyan-aniline | do | do | Do. |
| 80 | 4-(2'-chloro-4'-nitrophenylazo)-aniline | do | Yellowish-tinged red. | Red. |
| 81 | 4-phenylazo-aniline | do | Orange | Brown. |
| 82 | 4-(2',4'-dinitrophenylazo)-aniline | do | Brown | Reddish-tinged brown. |
| 83 | 4-(4'-nitrophenylazo)-aniline | do | do | Brown. |
| 84 | 4-nitro-aniline | [structure: phenyl(OCH₃)-N-H-C(CN)(COOC₂H₅)] | Reddish-tinged orange. | Reddish-tinged orange. |
| 85 | 2-bromo-4-nitro-6-cyan-aniline | Same as above | Reddish-tinged violet. | Reddish-tinged violet. |
| 86 | 2-chloro-4-nitro-6-cyan-aniline | do | do | Do. |
| 87 | 2-chloro-4-nitro-aniline | [structure: phenyl-N-H-C(COCH₃)(COCH₃)] | Bluish-tinged red. | Bluish-tinged red. |
| 88 | 2-cyano-4-nitroaniline | Same as above | Reddish-tinged violet. | Claret. |
| 89 | 2-methylsulphonyl-4-nitro-aniline | do | do | Bluish-tinged red. |
| 90 | 2-chloro-4-nitro-aniline | [structure: phenyl(CH₃)-N-H-C(CN)(CN)] | Bluish-tinged red. | |
| 91 | 2-cyano-4-nitro-aniline | Same as above | Reddish-tinged violet. | |
| 92 | 2,6-dichloro-4-nitro-aniline | do | Brown | Brown. |
| 93 | 2-chloro-4-methylsulphonyl-aniline | do | Orange | Orange. |
| 94 | 2,4-dinitro-6-chlor-aniline | [structure: phenyl(OCH₃)(NHCOC₂H₅)-N-C(CN)(COOC₂H₅)] | Blue | Blue. |

EXAMPLE 21

1.5 parts of sodium nitrite are slowly added at 5° C. to 10 parts of concentrated sulphuric acid. 20 parts by volume of a mixture of propionic acid and acetic acid (volume ratio 3:7) are added dropwise thereto. 2.73 parts of 2-amino-5-nitrothiazole are diazotised with this mixture and subsequently coupled analogously to Example 1 with the equivalent quantity of the coupling component of formula

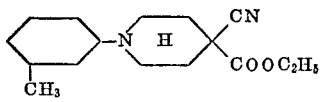

The dyestuff of formula

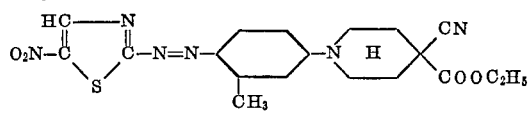

is obtained which dyes polyesters fibres in blue shades from an aqueous dispersion.

If the phenyl-piperidines mentioned in column II are coupled as above with the diazonium compounds of the amines mentioned in column I dyestuffs are obtained which dye polyester fibres in the shades indicated in column III.

parts by volume of 4 N sodium nitrite solution. The diazo solution is added at 0–5° C. to a solution of 5.16 parts of 4-carbethoxy-4-cyano-N-phenylpiperidine in 30 parts of alcohol. The coupling mixture is rendered neutral to Congo Red by adding sodium acetate solution. After completion of coupling the dyestuff is filtered off, washed with water and dried. The resulting dyestuff of formula ClCH₂CH₂HNO₂S—⟨ ⟩—N=N—⟨ ⟩—N(H)(CN)(COOC₂H₅) (with Cl)

dyes polyamide fibres, after treatment with alkali or fixing by heat, in orange shades having very good fastness properties.

If 4-amino-ω-chloracetophenone is used as the diazo component, a dyestuff of similar properties is obtained.

EXAMPLE 23

4.57 parts of 4 - aminophenacyltrimethylammonium chloride are dissolved in 20 parts of water and 7 parts by volume of concentrated hydrochloric acid are added. The solution is diazotised at 0–5° C. by adding 5 parts by volume of 4 N sodium nitrite solution. The solution is added at 0–5° C. to a solution of 5.16 parts of 4-cyano-4-carbethoxy-N-phenylpiperidine and 14 parts by volume of

EXAMPLE 22

5.38 parts of 4-amino-3-chlorobenzenesulpho-β-chlorethylamide are triturated with 8 parts by volume of concentrated hydrochloric acid and diluted with 80 parts of water. The solution is diazotised at 0–5° C. by adding 5 concentrated hydrochloric acid and 50 parts of water. After completion of coupling the dyestuff is precipitated by adding salt and zinc chloride. The dyestuff is filtered off, redissolved in hot water and salted out from the filtrate after filtering the solution. The precipitated dyestuff of formula

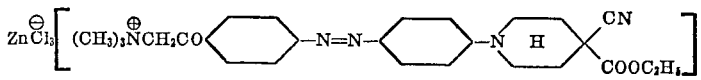

is filtered off and dried. It dyes polyacrylonitrile fibers in orange shades having good fastness properties.

If the amines mentioned in column I in the table below are diazotised and coupled with the coupling components indicated in column II, dyestuffs are obtained which dye acrylic fibres in the shades indicated in column III.

sulting solution and the reaction mixture is stirred for a further 3 hours at 0–5° C. 7.5 parts of urea are added in portions to this diazo solution. The diazo solution thus obtained is added at 0–5° C. to a solution of 25.8 parts of 4-cyano-4-carbethoxy-N-phenylpiperidine in 150 parts of alcohol. The coupling mixture is rendered neutral to

| | I | II | III |
|---|---|---|---|
| 1 | Cl$^\ominus$ (CH$_3$)$_2$N—CH$_2$CO—⟨⟩—NH$_2$ <br> \|<br>NHCOCH$_3$ | ⟨⟩—N(H)⟨⟩(CN)(COOCH$_3$) | Orange. |
| 2 | Br$^\ominus$ (C$_2$H$_5$)$_3$N$^\oplus$—CH$_2$CO—⟨⟩—N=N—⟨⟩(CH$_3$)—NH$_2$ | ⟨⟩—N(H)⟨⟩(CN)(CN) | Red. |
| 3 | Cl$^\ominus$ (CH$_3$)$_3$N$^\oplus$CH$_2$CO—⟨⟩—NH$_2$ (naphthyl) | ⟨⟩—N(H)⟨⟩(COOC$_2$H$_5$)(COOC$_2$H$_5$) | Brown. |
| 4 | J$^\ominus$ (C$_2$H$_5$)$_2$N$^\oplus$(CH$_3$)—(CH$_2$)$_2$HNOC—⟨⟩—NH$_2$ | ⟨⟩—N(H)⟨⟩(CN)(COOC$_2$H$_5$) <br> NHCOCH$_3$ | Red. |
| 5 | Br$^\ominus$ (CH$_3$)$_2$N$^\oplus$(C$_4$H$_9$)—(CH$_2$)$_3$HNO$_2$S—⟨⟩—NH$_2$ | [⟨⟩—N(H)⟨⟩(CN)(CONHCH$_2$—)]$_2$ | Orange. |
| 6 | Cl$^\ominus$ ⟨pyridinium-CH$_3$⟩—(CH$_2$)$_2$NHO$_2$S—⟨⟩(Cl)—NH$_2$ | ⟨⟩(OCH$_3$)—N(CH$_3$)⟨⟩(CN)(COOC$_2$H$_5$) | Red. |
| 7 | Cl$^\ominus$ CH$_3$—⟨⟩—N$^+$(CH$_3$)—(CH$_2$)$_2$HNO$_2$S—⟨⟩(Cl,Cl)—NH$_2$ | ⟨⟩—N(CH$_3$)⟨⟩(CN)(CN) | Brown. |
| 8 | C$_7$H$_7$SO$_3^\ominus$ O$_2$N—⟨⟩(OC$_2$H$_4$-pyridyl)—NH$_2$ | ⟨⟩(Cl)—N(H)⟨⟩(CN)(COOCH$_3$) | Red. |
| 9 | CH$_3$SO$_4^\ominus$ O$_2$N—⟨⟩(O—⟨⟩—COCH$_2$N$^\oplus$(CH$_3$)(C$_4$H$_9$)$_2$)—NH$_2$ | ⟨⟩(OCH$_3$)—N(H)⟨⟩(COCH$_3$)(COOC$_2$H$_5$) | Red. |

EXAMPLE 24

7.6 parts of sodium nitrite are scattered at 0° C. to 10° C. in 90 parts of concentrated sulphuric acid and thereafter the mixture is heated to 65° C. until everything has dissolved and then cooled to 0° C., and 100 parts by volume of a mixture of glacial acetic acid and propionic acid, in the ratio of 6:1, are added dropwise. 19.4 parts of 6-ethoxy-2-aminobenzthiazole dissolved in 100 parts by volume of a mixture of glacial acetic acid and propionic acid (6:1) are added dropwise to the resulting solution and the reaction mixture is stirred for a further 3 hours at 0–5° C. 7.5 parts of urea are added in portions to this diazo solution. The diazo solution thus obtained is added at 0–5° C. to a solution of 25.8 parts of 4-cyano-4-carbethoxy-N-phenylpiperidine in 150 parts of alcohol. The coupling mixture is rendered neutral to Congo Red by means of sodium acetate solution. After completion of the coupling the dyestuff is filtered off, washed with water and dried.

6.94 parts of the dyestuff obtained above are dissolved in 940 parts of warm chlorobenzene. A solution of 2.85 parts of dimethyl sulphate in 30 parts of chlorobenzene is added dropwise and the reaction mixture is further stirred for 4 hours at 95–100° C. The mixture is then cooled and filtered. The filter cake is dissolved in hot water and clarified by filtration. The filtrate is salted out. The precipitated dyestuff of formula

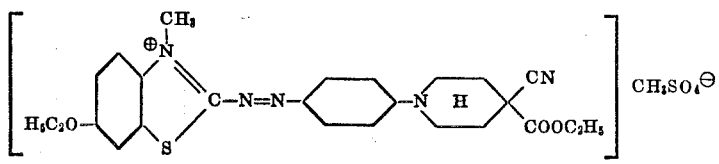

is filtered off and dried. It dyes polyacrylonitrile fibres in blue shades having excellent fastness properties. Dyestuffs are obtained in an analogous manner if the diazo compounds of the amines listed in column I are coupled with coupling components indicated in column II and the dyestuffs are treated with the alkylating agents indicated in column III. The dyestuffs dye acrylic fibres in the shades indicated in column IV.

| | I | II | III | IV |
|---|---|---|---|---|
| 1 | benzothiazole-2-amide | aniline coupler, CN, COOCH₃ | Dimethyl sulphate | Blue |
| 2 | methoxy-benzothiazole-amide | aniline coupler, CN, CN | do | Do |
| 3 | acetamido-benzothiazole-amide | aniline coupler, COOC₂H₅, COOC₂H₅ | do | Do |
| 4 | phenyl-benzothiazole-amine | aniline coupler, CONH₂, COOC₂H₅ | Toluenesulphonic acid methyl ester | Red |
| 5 | thiadiazole-amide | aniline coupler (methyl-substituted), CN, COOC₂H₅ | Dimethyl sulphate | Violet |
| 6 | thiadiazole-amide | aniline coupler (methoxy-substituted), CN, COOC₂H₅ | do | Red |
| 7 | amino-indazole-amide | aniline coupler, CN, COOCH₃ | Diethyl sulphate | Violet |
| 8 | methyl-thiadiazole-amide | aniline coupler (chloro-substituted), COCH₃, COOCH₃ | do | Do |
| 9 | aminopyridine | aniline coupler, CN, COOC₂H₅ | Toluenesulphonic acid methyl ester | Orange |

TABLE—Continued

| | I | II | III | IV |
|---|---|---|---|---|
| 10 | (structure with Cl, NH₂, (CH₂)₂N(CH₂)₂HNO₂S) | (structure with CN, CN, CH₃) | 2-chlorethanol | Scarlet. |
| 11 | (C₂H₅)₂NH₂C₂OOC—⟨NH₂⟩ | (structure with COCH₃, COOC₂H₅, OCH₃) | 2-chloropropionic acid amide | Do. |
| 12 | H—O—NCH₃CO—⟨NH₂⟩ | (structure with COOC₂H₅) | Benzyl chloride | Do. |
| 13 | N⟩—(CH₂)₂NHO₂S—⟨NH₂⟩ | (structure with COCH₃, Cl, CH₃) | Methyl iodide | Orange. |
| 14 | O₂N—⟨NH₂ / OC₄H₉N H⟩ | (structure with CN, COOC₂H₅) | Benzenesulphonic acid methyl ester | Scarlet. |
| 15 | N⟩—(CH₂)₂HNOC—⟨N=N—⟨NH₂ / CH₃⟩⟩ | (structure with CN, COOC₂H₅, OC₂H₅) | Butyl bromide | Red. |

DYEING INSTRUCTION 1 part of the dyestuff obtained according to Example 24 is dissolved in 5000 parts of water with the addition of 2 parts of 40% strength acetic acid. 100 parts of dried yarn of polyacrylonitrile staple fibres are introduced into this dyebath at 60° C., the temperature is raised to 100° C. over the course of ½ an hour and the material dyed for 1 hour at boiling temperature. The dyeing is then well rinsed and dried. A blue dyeing having very good fastness properties is obtained.

What is claimed is:

1. An azo dyestuff of the formula

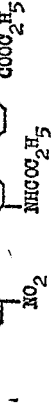

wherein $a$ is hydrogen, chloro, bromo, methyl, methoxy, nitro, cyano, $C_{2-3}$ carbalkoxy, methylsulfonyl, sulfonamido, N-methylsulfonamido, N,N-di($C_{1-2}$ alkyl) sulfonamido or sulfamato; $b$ is hydrogen, chloro, bromo, methyl, cyano or trifluoromethyl; $c'$ is chloro, bromo, nitro, cyano, $C_{1-3}$ carbalkoxy, methyl, methylsulfonyl, sulfonamido, N-methylsulfonamido, N,N-di($C_{1-2}$ alkyl) sulfonamido or sulfamato; $d'$ is hydrogen, halogen, cyano, cyclohexyloxycarbonyl or carboxylic acid amide, sulfonamido, N-methylsulfonamido, N,N-di($C_{1-2}$ alkyl) sulfonamido, sulfamato, phenylazo, methylphenylazo, methoxyphenylazo, β-chloroethylsulfonamido, chlorophenylazo, dichlorophenylazo, sulfonamidophenyl-azo; $d$ is hydrogen, halogen, low molecular alkyl, alkoxy or alkylmercapto, cyclohexyl, cyclohexylmethyl or benzyl; and $c$ is the same or is chloro, trifluoromethyl, $C_{1-4}$ alkylcarbonylamino or $C_{1-4}$ alkoxycarbonylamino; $X_1$ is cyano, $C_{2-5}$ carbalkoxy, carbamido, carbamoyl, $C_{1-2}$ alkylated carbamoyl, N-phenylcarbamoyl, acetyl, phenylcarbamoyl, phenylsulfonyl or p-methylphenylsulfonyl and $Y_1$ is hydrogen, cyano or $C_{2-4}$ carbalkoxy, said dyestuff being free from acidic groups imparting solubility in water.

2. A dyestuff of the formula

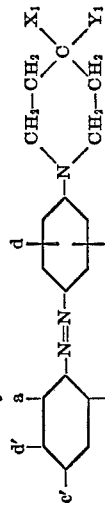

References Cited

UNITED STATES PATENTS 3,383,379  5/1968  Wallace et al. _____ 260—152

JOSEPH REBOLD, Primary Examiner

D. M. PAPUGA, Assistant Examiner

U.S. Cl. X.R.

260—146 R, 152, 153, 154, 155, 157, 158, 160, 196, 205, 208, 247.7 K, 293.73, 293.75, 293.8, 293.81, 296 R, 397.7, 459, 558 A, 562 H, 562 N, 370.5 C; 8—176

PO-1050
(5/69)

UNITED STATES PATENT OFFICE
CERTIFICATE OF CORRECTION

Patent No. 3,663,529            Dated May 16, 1972

Inventor(s) VED PARKASH KUBBA ET AL

It is certified that error appears in the above-identified patent and that said Letters Patent are hereby corrected as shown below:

Column 1, line 6, delete "CIBA Limited" and substitute --- CIBA-GEIGY AG ---.

Signed and sealed this 2nd day of April 1974.

(SEAL)
Attest:

EDWARD M. FLETCHER, JR.           C. MARSHALL DANN
Attesting Officer                   Commissioner of Patents